US012654509B2

(12) United States Patent
Mimatsu et al.

(10) Patent No.: US 12,654,509 B2
(45) Date of Patent: Jun. 16, 2026

(54) TEMPERATURE CONTROL SYSTEM

(71) Applicant: SUBARU CORPORATION, Tokyo (JP)

(72) Inventors: Hayata Mimatsu, Tokyo (JP); Satoshi Inoue, Tokyo (JP); Tomoyuki Yamamuro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 406 days.

(21) Appl. No.: 18/415,493

(22) Filed: Jan. 17, 2024

(65) Prior Publication Data

US 2024/0262158 A1 Aug. 8, 2024

(30) Foreign Application Priority Data

Feb. 3, 2023 (JP) ................................. 2023-015586

(51) Int. Cl.
*B60H 1/00* (2006.01)

(52) U.S. Cl.
CPC ..... *B60H 1/00278* (2013.01); *B60H 1/00807* (2013.01); *B60H 1/00835* (2013.01)

(58) Field of Classification Search
CPC ...... B60H 1/03; B60H 1/039; B60H 1/00278; B60H 1/00807; B60H 1/00835; B60H 1/00849; B60H 2001/003; H10M 10/667
See application file for complete search history.

(56) References Cited

U.S. PATENT DOCUMENTS

| | | | | | |
|---|---|---|---|---|---|
| 5,647,534 A | * | 7/1997 | Kelz | ........................ | B60K 1/04 |
| | | | | | 165/80.4 |
| 6,094,927 A | * | 8/2000 | Anazawa | .......... | H01M 10/6563 |
| | | | | | 62/239 |
| 2003/0080714 A1 | * | 5/2003 | Inoue | ................ | H01M 10/6571 |
| | | | | | 320/150 |

(Continued)

FOREIGN PATENT DOCUMENTS

| | | | | | | |
|---|---|---|---|---|---|---|
| CN | 203372029 U | * | 1/2014 | ............. | B60L 58/26 |
| JP | 2009-252659 A | | 10/2009 | | |
| WO | WO-2013175739 A1 | * | 11/2013 | ........ | H01M 10/6561 |

OTHER PUBLICATIONS

CN203372029 and translation (Year: 2014).*
WO2013175739 and translation (Year: 2013).*

*Primary Examiner* — Steven S Anderson, II
(74) *Attorney, Agent, or Firm* — Rimon P.C.

(57) ABSTRACT
A temperature control system includes a battery; a power electronics device that converts high-voltage electric power; an air passage; an inside-air intake passage and an outside-air intake passage that acquire inside air and outside air of a vehicle, and supply the airs to the air passage; an intake opening/closing member that opens and closes between the air passage and each of the intake passages; a passage switch that switches among a power-electronics prioritized state, a battery prioritized state, and a retention state; and a control device including a processor and a memory coupled to the processor. In a state in which a temperature of the outside air is lower than a battery lower limit temperature, the processor performs switching control of a power-electronics prioritized state, a battery prioritized state, and a retention state with the passage switches, based on an output value of the power electronics device.

5 Claims, 11 Drawing Sheets

(56)          References Cited

U.S. PATENT DOCUMENTS

2007/0178346  A1 *   8/2007  Kiya  .................. H01M 10/486
                                                                    429/432
2009/0260905  A1 *  10/2009  Shinmura  .............. B60L 50/64
                                                                    165/104.11
2016/0318370  A1 *  11/2016  Rawlinson  ......... B60H 1/32281

* cited by examiner

FIG. 2A
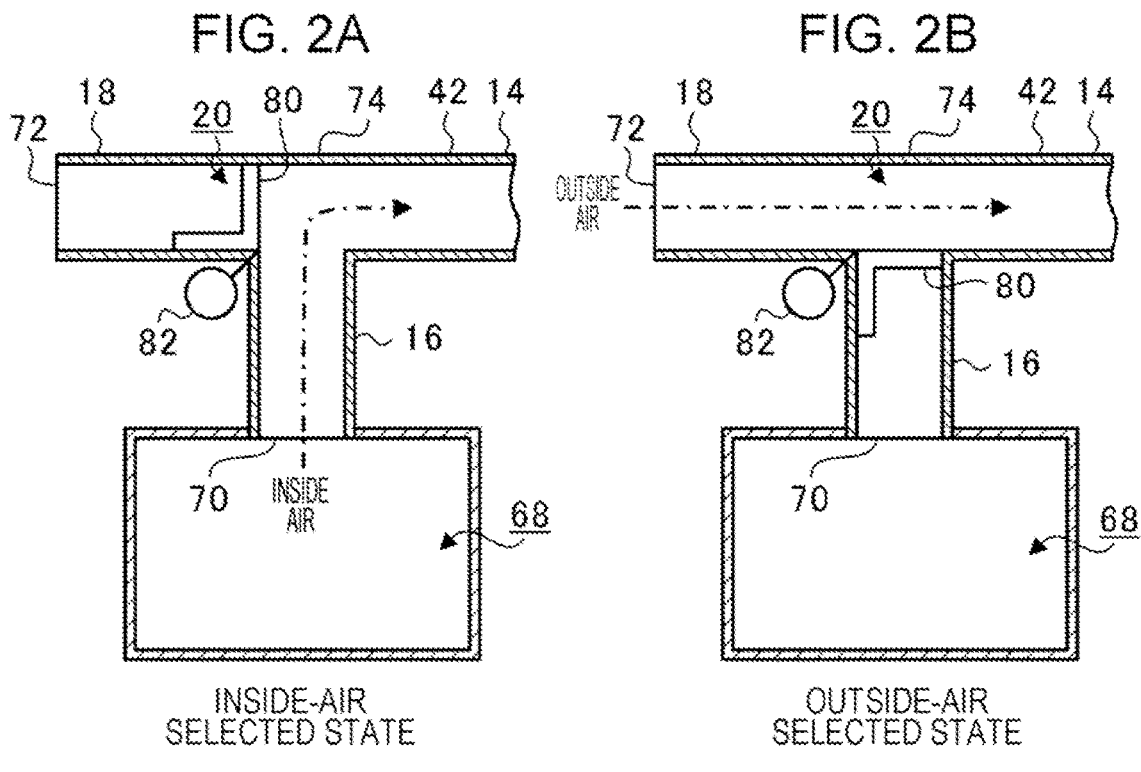
INSIDE-AIR
SELECTED STATE
FIG. 2B
OUTSIDE-AIR
SELECTED STATE
FIG. 2C
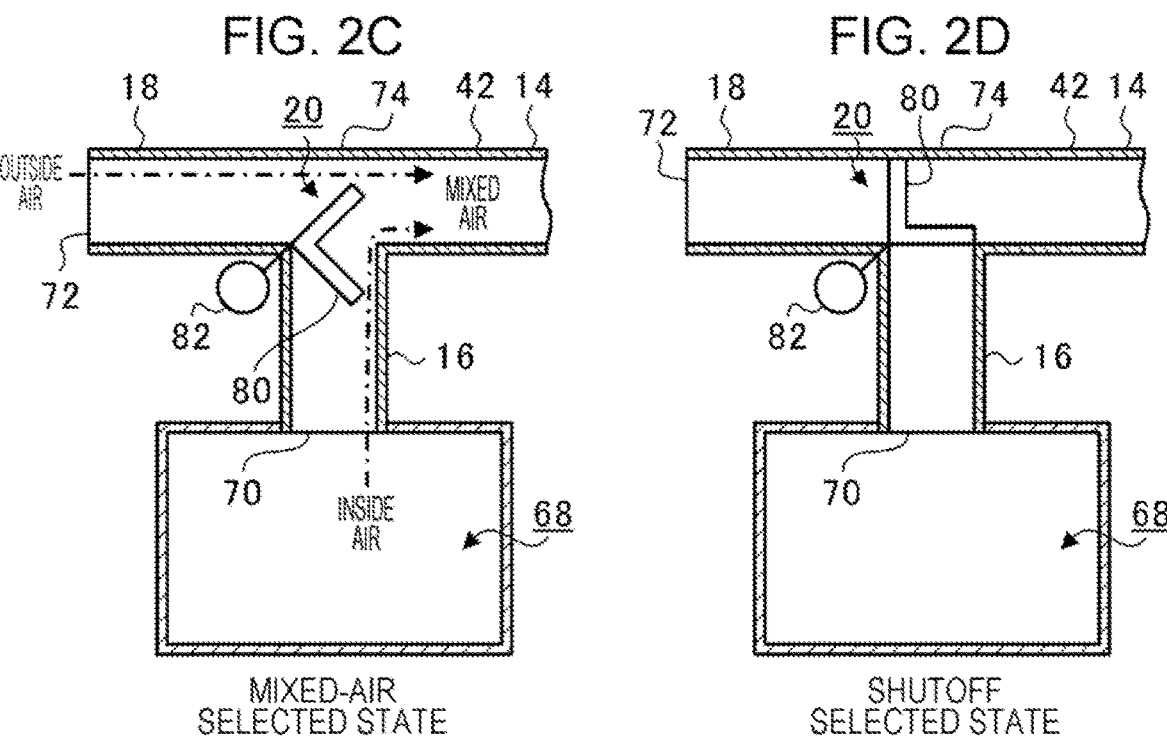
MIXED-AIR
SELECTED STATE
FIG. 2D
SHUTOFF
SELECTED STATE

POWER-ELECTRONICS
PRIORITIZED STATE

BATTERY
PRIORITIZED STATE

RETENTION STATE

FIG. 4

| NAME OF TEMPERATURE RANGE | TEMPERATURE RANGE |
|---|---|
| HIGH | HIGHER THAN OR EQUAL TO BATTERY UPPER LIMIT TEMPERATURE |
| MIDDLE HIGH | HIGHER THAN OR EQUAL TO REFERENCE TEMPERATURE AND LOWER THAN BATTERY UPPER LIMIT TEMPERATURE |
| MIDDLE LOW | HIGHER THAN OR EQUAL TO BATTERY LOWER LIMIT TEMPERATURE AND LOWER THAN REFERENCE TEMPERATURE |
| LOW | LOWER THAN BATTERY LOWER LIMIT TEMPERATURE |

FIG. 5

| TEMPERATURE OF OUTSIDE AIR | TEMPERATURE OF INSIDE AIR | POWER ELECTRONICS | INTAKE OPENING/CLOSING MEMBER | PASSAGE SWITCHES |
|---|---|---|---|---|
| LOW | HIGH | HIGH | OUTSIDE AIR | POWER-ELECTRONICS PRIORITIZED |
| LOW | HIGH | LOW | SHUTOFF | RETENTION |
| LOW | MIDDLE HIGH | HIGH | OUTSIDE AIR | POWER-ELECTRONICS PRIORITIZED |
| LOW | MIDDLE HIGH | LOW | MIXED AIR | BATTERY PRIORITIZED |
| LOW | MIDDLE LOW | HIGH | OUTSIDE AIR | POWER-ELECTRONICS PRIORITIZED |
| LOW | MIDDLE LOW | LOW | INSIDE AIR | BATTERY PRIORITIZED |
| LOW | LOW | HIGH | HIGHER-TEMPERATURE AIR | POWER-ELECTRONICS PRIORITIZED |
| LOW | LOW | LOW | SHUTOFF | RETENTION |

FIG. 6

| TEMPERATURE OF OUTSIDE AIR | TEMPERATURE OF INSIDE AIR | POWER ELECTRONICS | INTAKE OPENING/CLOSING MEMBER | PASSAGE SWITCHES |
|---|---|---|---|---|
| HIGH | HIGH | HIGH | LOWER-TEMPERATURE AIR | POWER-ELECTRONICS PRIORITIZED |
| HIGH | HIGH | LOW | LOWER-TEMPERATURE AIR | BATTERY PRIORITIZED |
| HIGH | MIDDLE HIGH | HIGH | INSIDE AIR | POWER-ELECTRONICS PRIORITIZED |
| HIGH | MIDDLE HIGH | LOW | INSIDE AIR | BATTERY PRIORITIZED |
| HIGH | MIDDLE LOW | HIGH | INSIDE AIR | POWER-ELECTRONICS PRIORITIZED |
| HIGH | MIDDLE LOW | LOW | INSIDE AIR | BATTERY PRIORITIZED |
| HIGH | LOW | HIGH | INSIDE AIR | POWER-ELECTRONICS PRIORITIZED |
| HIGH | LOW | LOW | SHUTOFF | RETENTION |
| MIDDLE HIGH | HIGH | HIGH | OUTSIDE AIR | POWER-ELECTRONICS PRIORITIZED |
| MIDDLE HIGH | HIGH | LOW | OUTSIDE AIR | BATTERY PRIORITIZED |
| MIDDLE HIGH | MIDDLE HIGH | HIGH | LOWER-TEMPERATURE AIR | POWER-ELECTRONICS PRIORITIZED |
| MIDDLE HIGH | MIDDLE HIGH | LOW | LOWER-TEMPERATURE AIR | BATTERY PRIORITIZED |
| MIDDLE HIGH | MIDDLE LOW | HIGH | INSIDE AIR | POWER-ELECTRONICS PRIORITIZED |
| MIDDLE HIGH | MIDDLE LOW | LOW | INSIDE AIR | BATTERY PRIORITIZED |
| MIDDLE HIGH | LOW | HIGH | INSIDE AIR | POWER-ELECTRONICS PRIORITIZED |
| MIDDLE HIGH | LOW | LOW | MIXED AIR | BATTERY PRIORITIZED |
| MIDDLE LOW | HIGH | HIGH | OUTSIDE AIR | POWER-ELECTRONICS PRIORITIZED |
| MIDDLE LOW | HIGH | LOW | OUTSIDE AIR | BATTERY PRIORITIZED |
| MIDDLE LOW | MIDDLE HIGH | HIGH | OUTSIDE AIR | POWER-ELECTRONICS PRIORITIZED |
| MIDDLE LOW | MIDDLE HIGH | LOW | OUTSIDE AIR | BATTERY PRIORITIZED |
| MIDDLE LOW | MIDDLE LOW | HIGH | LOWER-TEMPERATURE AIR | POWER-ELECTRONICS PRIORITIZED |
| MIDDLE LOW | MIDDLE LOW | LOW | LOWER-TEMPERATURE AIR | BATTERY PRIORITIZED |
| MIDDLE LOW | LOW | HIGH | INSIDE AIR | POWER-ELECTRONICS PRIORITIZED |
| MIDDLE LOW | LOW | LOW | OUTSIDE AIR | BATTERY PRIORITIZED |

Figure 8:
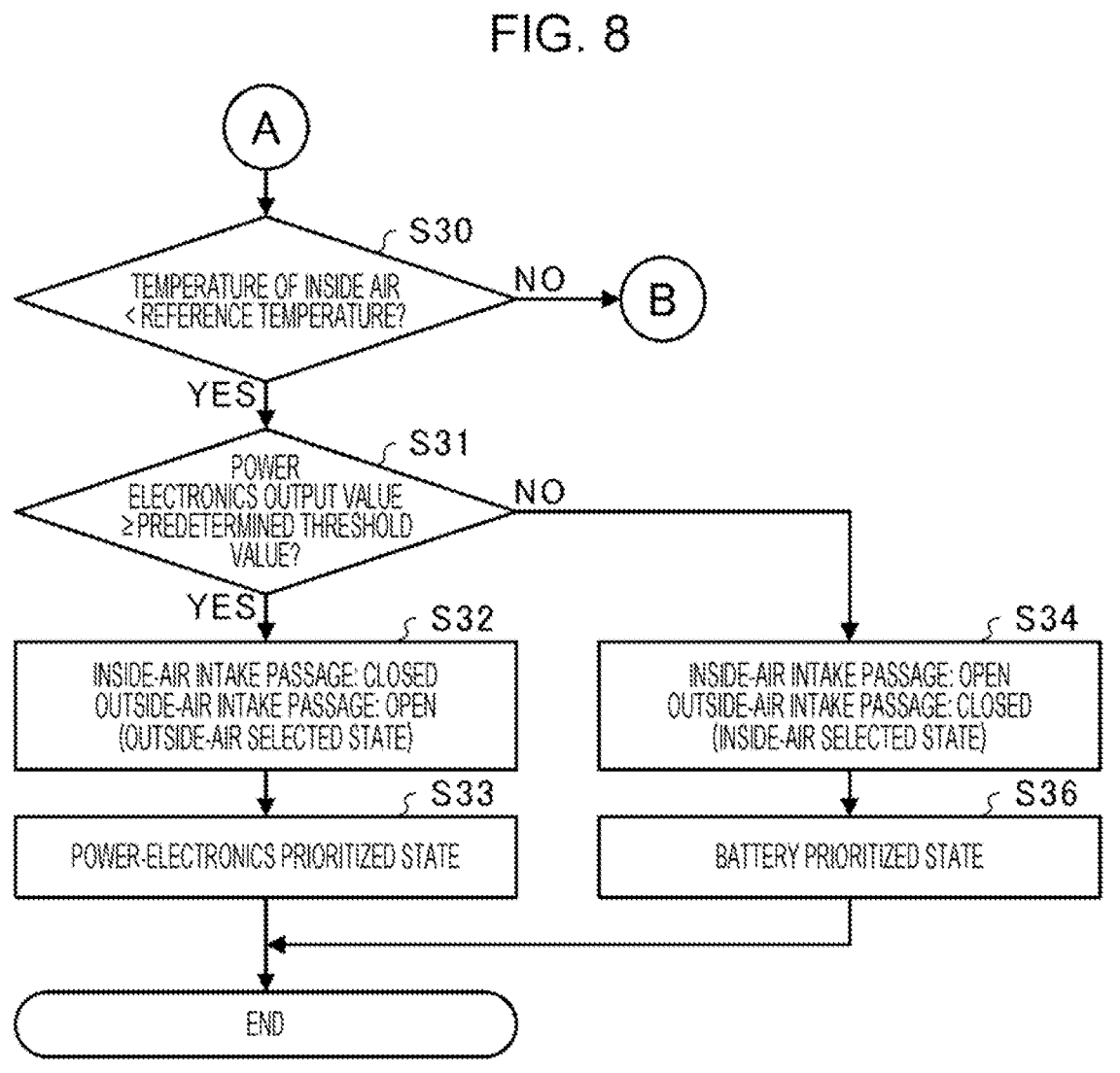

S30
TEMPERATURE OF INSIDE AIR
< REFERENCE TEMPERATURE?  → NO → B

YES

S31
POWER
ELECTRONICS OUTPUT VALUE
≥ PREDETERMINED THRESHOLD
VALUE?  → NO

YES

S32
INSIDE-AIR INTAKE PASSAGE: CLOSED
OUTSIDE-AIR INTAKE PASSAGE: OPEN
(OUTSIDE-AIR SELECTED STATE)

S34
INSIDE-AIR INTAKE PASSAGE: OPEN
OUTSIDE-AIR INTAKE PASSAGE: CLOSED
(INSIDE-AIR SELECTED STATE)

S33
POWER-ELECTRONICS PRIORITIZED STATE

S36
BATTERY PRIORITIZED STATE

END

TEMPERATURE CONTROL SYSTEM

CROSS-REFERENCE TO RELATED APPLICATIONS

The present application claims priority from Japanese Patent Application No. 2023-015586 filed on Feb. 3, 2023, the entire contents of which are hereby incorporated by reference.

BACKGROUND

The present disclosure relates to a temperature control system.

For example, Japanese Unexamined Patent Application Publication (JP-A) No. 2009-252659 discloses a technique for controlling the temperature of a power supply device mounted on a vehicle. In JP-A No. 2009-252659, when a battery temperature is higher than a threshold value, a cooling capacity of a battery pack is calculated from a vehicle speed and an outside air temperature. In addition, in JP-A No. 2009-252659, in accordance with the calculated cooling capacity, it is selected whether to cool the battery pack with inside air, which is air inside the vehicle, or outside air, which is air outside the vehicle.

SUMMARY

An aspect of the disclosure provides a temperature control system including a battery, a power electronics device, an air passage, an inside-air intake passage, an outside-air intake passage, an intake opening/closing member, passage switches, and a control device. The battery is mounted on a vehicle. The power electronics device is mounted on the vehicle and configured to convert high-voltage electric power. The air passage is an air passage in which the battery and the power electronics device are disposed and through which air that exchanges heat with the battery and the power electronics device is to flow. The inside-air intake passage is configured to acquire inside air that is air inside the vehicle, and to supply the inside air to the air passage. The outside-air intake passage is configured to acquire outside air that is air outside the vehicle, and to supply the outside air to the air passage. The intake opening/closing member is configured to be open and close between the air passage and the inside-air intake passage as well as open and close between the air passage and the outside-air intake passage. The passage switches are configured to switch among a power-electronics prioritized state in which the air introduced into the air passage exchanges heat with the power electronics device earlier than with the battery, a battery prioritized state in which the air introduced into the air passage exchanges heat with the battery earlier than with the power electronics device, and a retention state in which the air is retained inside the air passage. The control device includes one or more processors and one or more memories coupled to the one or more processors. The one or more processors are configured to perform a process including, in a state in which a temperature of the outside air is lower than a battery lower limit temperature that is a lower limit value of a proper battery temperature range that is a temperature range expected for appropriately operating the battery, performing switching control of the power-electronics prioritized state, the battery prioritized state, and the retention state with the passage switches, based on an output value of the power electronics device.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIGS. 2A to 2D are diagrams illustrating states of an intake opening/closing member;

FIG. 4 is a diagram illustrating definitions of names of temperature ranges;

FIG. 5 is a diagram illustrating control performed when a temperature of outside air is "low";

FIG. 6 is a diagram illustrating control performed when the temperature of the outside air is "high", "middle high", and "middle low";

FIG. 8 is a flowchart illustrating an operation flow of the temperature controller;

DETAILED DESCRIPTION

A vehicle such as an electric vehicle has a power electronics device mounted thereon in addition to a battery. The power electronics device converts high-voltage electric power, such as an inverter or a direct current-direct current (DC-DC) converter. Since the power electronics device generates heat when operating, it is desired to actively perform temperature control. As such, it is desirable to appropriately perform temperature control of both the battery and the power electronics device.

Therefore, it is desirable to provide a temperature control system capable of appropriately performing the temperature control of the battery and the power electronics device.

Figure 1:
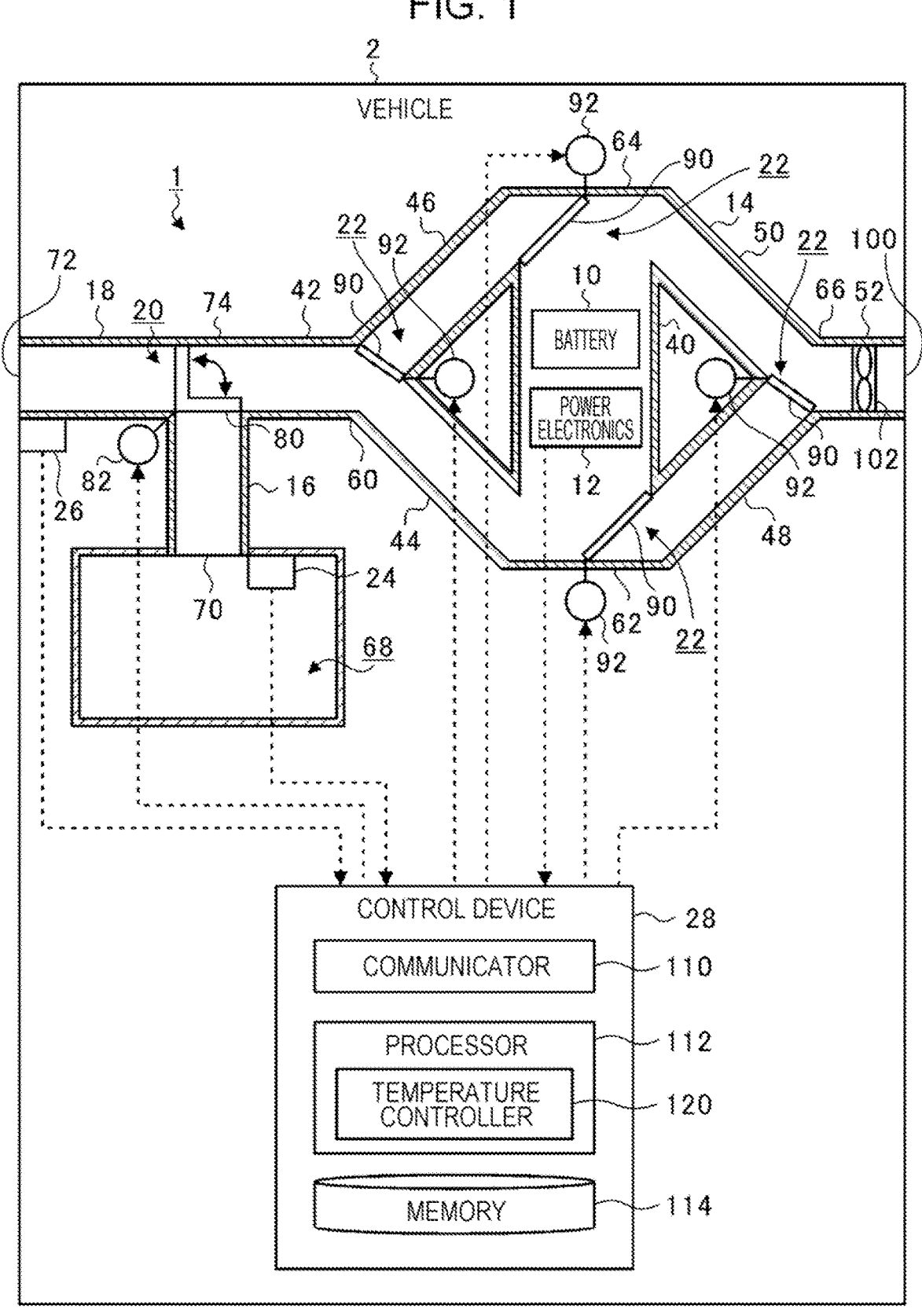
FIG. 1 is a schematic diagram illustrating a configuration of a vehicle to which a temperature control system according to an embodiment is applied.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1 is a schematic diagram illustrating a configuration of a vehicle 2 to which a temperature control system 1 according to the embodiment is applied. The vehicle 2 is, for example, an electric vehicle including a motor as a drive source. The vehicle 2 may be a hybrid electric vehicle including a motor and an engine as driving sources.

The vehicle 2 includes a battery 10, a power electronics device 12, an air passage 14, an inside-air intake passage 16, an outside-air intake passage 18, an intake opening/closing member 20, passage switches 22, an inside-air temperature sensor 24, an outside-air temperature sensor 26, and a control device 28.

The battery 10 is, for example, a chargeable and dischargeable secondary battery, such as a lithium ion battery. The battery 10 is mounted on the vehicle 2 and supplies electric power to high-voltage system wiring of the vehicle 2.

The battery 10 has a proper battery temperature range, which is a temperature range expected for proper operation of the battery 10. The temperature control of the battery 10 may be performed such that the temperature of the battery 10 falls within the proper battery temperature range.

The power electronics device 12 is mounted on the vehicle 2 and is electrically coupled to the high-voltage system wiring of the vehicle 2. The power electronics device 12 converts high-voltage electric power. The power electronics device 12 is, for example, an inverter that uses electric power supplied from the high-voltage system wiring to drive a motor for traveling, a DC-DC converter that supplies electric power from the high-voltage system wiring to low-voltage system wiring, or the like. Hereinafter, for convenience of description, the power electronics device 12 may be referred to as "power electronics".

Since the power electronics device 12 is coupled to the high-voltage system wiring, a large amount of heat is generated due to the flow of current. In order to suppress an increase in temperature due to heat generation, the temperature control of the power electronics device 12 may be actively performed.

Based on the above, the temperature control system 1 according to the embodiment performs the temperature control of the battery 10 and the power electronics device 12.

The battery 10 and the power electronics device 12 are disposed in the air passage 14. Air flows through the air passage 14. The air exchanges heat with the battery 10 and the power electronics device 12. In more detail, the air passage 14 is divided into a main passage 40, a common intake passage 42, a first branch passage 44, a second branch passage 46, a third branch passage 48, a fourth branch passage 50, and an exhaust passage 52.

The battery 10 and the power electronics device 12 are disposed in the main passage 40. The battery 10 and the power electronics device 12 are disposed in series in the longitudinal direction of the main passage 40. Therefore, when the air flows from the battery 10 side to the power electronics device 12 side in the main passage 40, the air flowing through the main passage 40 first exchanges heat with the battery 10. In contrast, when the air flows from the power electronics device 12 side to the battery 10 side in the main passage 40, the air flowing through the main passage 40 first exchanges heat with the power electronics device 12.

One end of the common intake passage 42 serves as a first node 60 that communicates with the first branch passage 44 and the second branch passage 46. An end of the main passage 40 on the power electronics device 12 side serves as a second node 62 that communicates with the first branch passage 44 and the third branch passage 48. An end of the main passage 40 on the battery 10 side serves as a third node 64 that communicates with the second branch passage 46 and the fourth branch passage 50. One end of the exhaust passage 52 serves as a fourth node 66 that communicates with the third branch passage 48 and the fourth branch passage 50.

That is, the common intake passage 42 communicates with the main passage 40 through the first branch passage 44 and also communicates with the main passage 40 through the second branch passage 46. The exhaust passage 52 communicates with the main passage 40 through the third branch passage 48 and also communicates with the main passage 40 through the fourth branch passage 50.

The common intake passage 42 is located upstream of the flow of the air flowing through the air passage 14 with respect to the main passage 40. The exhaust passage 52 is located downstream of the flow of the air flowing through the air passage 14 with respect to the main passage 40.

The inside-air intake passage 16 communicates with an end of the common intake passage 42 opposite to the first node 60. The inside-air intake passage 16 acquires inside air, which is air in an interior 68 of the vehicle 2, and supplies the inside air to the air passage 14. The inside air may be air in a cabin of the vehicle 2 configured to accommodate one or more occupants, air in a luggage room of the vehicle 2 configured to store luggage, or the both.

At an end of the inside-air intake passage 16 opposite to the common intake passage 42, an inside-air acquisition port 70 is formed. The inside-air acquisition port 70 is open to the interior 68 of the vehicle 2. For example, the inside-air acquisition port 70 is below a rear seat of the vehicle 2. Note that the inside-air acquisition port 70 is not limited to that disposed at the illustrated position and may be disposed at any position at which the inside air can be appropriately acquired.

The outside-air intake passage 18 communicates with an end of the common intake passage 42 opposite to the first node 60. The outside-air intake passage 18 acquires outside air, which is air outside the vehicle 2, and supplies the outside air to the air passage 14.

At an end of the outside-air intake passage 18 opposite to the common intake passage 42, an outside-air acquisition port 72 is formed. The outside-air acquisition port 72 is open to the outside of the vehicle 2. For example, the outside-air acquisition port 72 is near a rear wheel in a lower portion of the vehicle 2. Note that the outside-air acquisition port 72 is not limited to that disposed at the illustrated position and may be disposed at any position at which the outside air can be appropriately acquired. In addition, the outside-air acquisition port 72 is open toward the rear of the vehicle 2 in order to suppress mixing of foreign matter. Note that the opening direction of the outside-air acquisition port 72 is not limited to the rear of the vehicle 2 and may be the front of the vehicle 2, for example.

The inside-air intake passage 16, the outside-air intake passage 18, and the common intake passage 42 are coupled, for example, in a T-shape at a merging portion 74 where the inside-air intake passage 16 and the outside-air intake passage 18 are coupled to the common intake passage 42. For example, the outside-air intake passage 18 is coupled so as to extend in the longitudinal direction of the common intake passage 42, and the inside-air intake passage 16 is coupled so as to extend in a direction perpendicular to the longitudinal direction of the common intake passage 42. Note that the inside-air intake passage 16 may be coupled so as to extend in the longitudinal direction of the common intake passage 42, and the outside-air intake passage 18 may be coupled so as to extend in a direction perpendicular to the longitudinal direction of the common intake passage 42.

The intake opening/closing member 20 is provided at the merging portion 74. The intake opening/closing member 20 is configured to be capable of opening and closing between the air passage 14 and the inside-air intake passage 16 and between the air passage 14 and the outside-air intake passage 18.

In more detail, the intake opening/closing member 20 includes a valve body 80 and an actuator 82. The valve body 80 is formed, for example, in a bent plate shape having an L-shaped cross section. The valve body 80 is configured to be movable between an end of the inside-air intake passage 16 on the common intake passage 42 side and an end of the outside-air intake passage 18 on the common intake passage 42 side. The actuator 82 drives the valve body 80 under the control of the control device 28.

FIGS. 2A to 2D are diagrams illustrating states of the intake opening/closing member 20. The intake opening/closing member 20 can switch between four states illustrated in FIGS. 2A, 2B, 2C, and 2D.

FIG. 2A illustrates an inside-air selected state in which the inside-air intake passage 16 is open and the outside-air intake passage 18 is closed. In the inside-air selected state, the inside air is introduced into the air passage 14 and the outside air is not introduced into the air passage 14, as indicated by the dashed-dotted arrow in FIG. 2A.

FIG. 2B illustrates an outside-air selected state in which the inside-air intake passage 16 is closed and the outside-air intake passage 18 is open. In the outside-air selected state, the outside air is introduced into the air passage 14 and the inside air is not introduced into the air passage 14, as indicated by the dashed-dotted arrow in FIG. 2B.

FIG. 2C illustrates a mixed-air selected state in which the inside-air intake passage 16 is open and the outside-air intake passage 18 is open. In the mixed-air selected state, mixed air of the inside air and the outside air is introduced into the air passage 14, as indicated by the dashed-dotted arrows in FIG. 2C.

FIG. 2D illustrates a shutoff selected state in which the inside-air intake passage 16 is closed and the outside-air intake passage 18 is closed. In the shutoff selected state, neither the inside air nor the outside air is introduced into the air passage 14.

In this manner, the intake opening/closing member 20 can be switched between the inside-air selected state, the outside-air selected state, the mixed-air selected state, and the shutoff selected state by the single valve body 80.

Note that the intake opening/closing member 20 is not limited to that in which the four states are switched by the single valve body 80. For example, the four states may be switched by providing two valve bodies. The two valve bodies are a first valve body that opens and closes the inside-air intake passage 16 and a second valve body that opens and closes the outside-air intake passage 18.

In addition, the intake opening/closing member 20 may be configured to be switched among three states, which are the inside-air selected state, the outside-air selected state, and the mixed-air selected state, excluding the shutoff selected state. In this case, the valve body 80 may be formed in a flat plate shape having an I-shaped cross section.

Referring back to FIG. 1, the respective passage switches 22 are provided at the first node 60, the second node 62, the third node 64, and the fourth node 66.

The passage switch 22 at the first node 60 is configured to be capable of exclusively opening and closing between the common intake passage 42 and the first branch passage 44 and between the common intake passage 42 and the second branch passage 46. The passage switch 22 at the second node 62 is configured to be capable of exclusively opening and closing between the main passage 40 and the first branch passage 44 and between the main passage 40 and the third branch passage 48. The passage switch 22 at the third node 64 is configured to be capable of exclusively opening and closing between the main passage 40 and the second branch passage 46 and between the main passage 40 and the fourth branch passage 50. The passage switch 22 at the fourth node 66 is configured to be capable of exclusively opening and closing between the exhaust passage 52 and the third branch passage 48 and between the exhaust passage 52 and the fourth branch passage 50.

In more detail, each of the passage switches 22 includes a valve body 90 and an actuator 92. The valve body 90 is formed in a flat plate shape, for example. The actuator 92 drives the valve body 90 under the control of the control device 28.

Figures 3A, 3B, 3C:
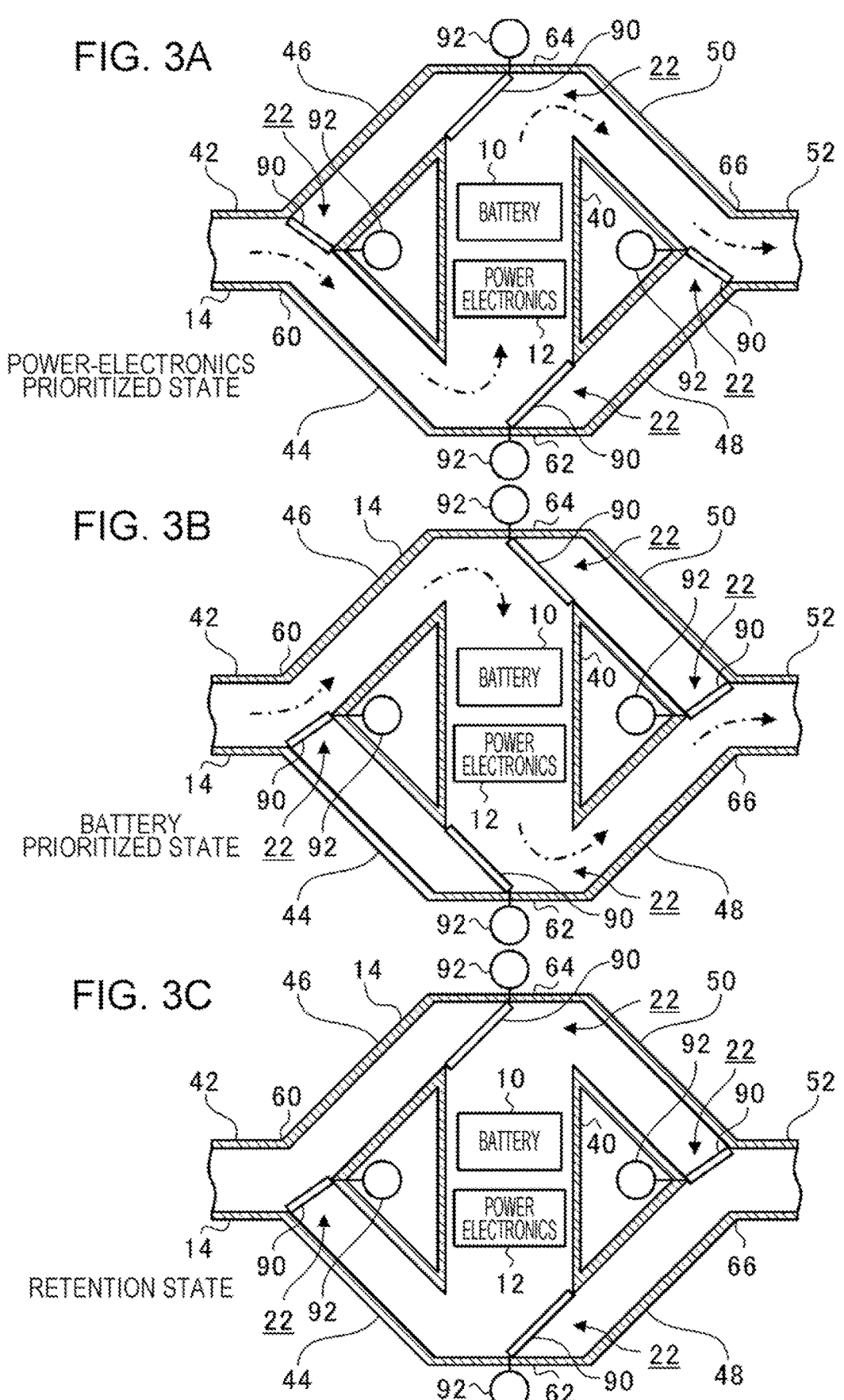
FIGS. 3A to 3C are diagrams illustrating states of passage switches.

FIGS. 3A to 3C are diagrams illustrating states of the passage switches 22. The passage switches 22 can switch among three states illustrated in FIG. 3A, FIG. 3B, and FIG. 3C.

FIG. 3A illustrates a power-electronics prioritized state in which the air introduced into the air passage 14 exchanges heat with the power electronics device 12 earlier than the battery 10.

In the power-electronics prioritized state, the passage switch 22 at the first node 60 is in a state in which the first branch passage 44 is open and the second branch passage 46 is closed. The passage switch 22 at the second node 62 is in a state in which the first branch passage 44 is open and the third branch passage 48 is closed. The passage switch 22 at the third node 64 is in a state in which the second branch passage 46 is closed and the fourth branch passage 50 is open. The passage switch 22 at the fourth node 66 is in a state in which the third branch passage 48 is closed and the fourth branch passage 50 is open.

Thus, in the power-electronics prioritized state, as indicated by the dashed-dotted arrows in FIG. 3A, the air flows through the common intake passage 42, the first branch passage 44, the main passage 40, the fourth branch passage 50, and the exhaust passage 52 in this order. Accordingly, heat exchange is performed on the power electronics device 12 and the battery 10 in this order.

FIG. 3B illustrates a battery prioritized state in which the air introduced into the air passage 14 exchanges heat with the battery 10 earlier than the power electronics device 12.

In the battery prioritized state, the passage switch 22 at the first node 60 is in a state in which the first branch passage 44 is closed and the second branch passage 46 is open. The passage switch 22 at the second node 62 is in a state in which the first branch passage 44 is closed and the third branch passage 48 is open. The passage switch 22 at the third node 64 is in a state in which the second branch passage 46 is open and the fourth branch passage 50 is closed. The passage switch 22 at the fourth node 66 is in a state in which the third branch passage 48 is open and the fourth branch passage 50 is closed.

Thus, in the battery prioritized state, as indicated by the dashed-dotted arrows in FIG. 3B, the air flows through the common intake passage 42, the second branch passage 46, the main passage 40, the third branch passage 48, and the exhaust passage 52 in this order. Accordingly, heat exchange is performed on the battery 10 and the power electronics device 12 in this order.

FIG. 3C illustrates a retention state in which the air is retained inside the air passage 14. In the retention state, the introduction of the air that exchanges heat with the battery 10 and the power electronics device 12 is limited.

In the retention state, the passage switch 22 at the first node 60 is in a state in which the first branch passage 44 is closed and the second branch passage 46 is open. The passage switch 22 at the second node 62 is in a state in which the first branch passage 44 is open and the third branch passage 48 is closed. The passage switch 22 at the third node 64 is in a state in which the second branch passage 46 is closed and the fourth branch passage 50 is open. The passage switch 22 at the fourth node 66 is in a state in which the third branch passage 48 is open and the fourth branch passage 50 is closed.

Thus, in the retention state, the main passage 40 is shut off from the common intake passage 42 by the passage switch 22 at the first node 60 and the passage switch 22 at the third node 64, and is also shut off from the exhaust passage 52 by the passage switch 22 at the second node 62 and the passage switch 22 at the fourth node 66. As a result, in the retention state, the air is not introduced into the main passage 40 and is retained inside the main passage 40. In the retained state, for example, the retained air is warmed by the heat generated by the power electronics device 12, and the battery 10 can be warmed by the retained warmed air.

Note that the open/close states of the passage switches 22 at the first node 60, the second node 62, the third node 64, and the fourth node 66 in the retention state are not limited to those described above. The respective branch passages may be open and closed such that the main passage 40 is shut off from the common intake passage 42 by the passage switch 22 at the first node 60 and the passage switch 22 at the second node 62, and is also shut off from the exhaust passage 52 by the passage switch 22 at the third node 64 and the passage switch 22 at the fourth node 66.

In this manner, the passage switches 22 can switch the state of the air passage 14 to any one of the power-electronics prioritized state, the battery prioritized state, and the retention state.

Referring back to FIG. 1, at an end of the exhaust passage 52 opposite to the main passage 40, an exhaust port 100 is formed. The exhaust port 100 is open at least to the outside of the vehicle 2. For example, the exhaust port 100 is in a trunk of the vehicle 2. Note that the exhaust port 100 is not limited to that disposed at the illustrated position. The exhaust port 100 may be disposed at any position at which the air having flowed through the air passage 14 can be appropriately discharged to the outside of the vehicle 2.

The exhaust passage 52 is provided with a fan 102. The fan 102 causes the air in the air passage 14 to flow.

In more detail, when the intake opening/closing member 20 is in the inside-air selected state and the air passage 14 is in the power-electronics prioritized state or the battery prioritized state, the fan 102 takes the inside air into the inside-air intake passage 16 through the inside-air acquisition port 70. Then, the fan 102 causes the taken inside air to flow to the exhaust passage 52 through the main passage 40 and discharges the inside air from the exhaust port 100. Thus, the temperature of the battery 10 and the temperature of the power electronics device 12 are controlled by the inside air flowing through the air passage 14.

In addition, when the intake opening/closing member 20 is in the outside-air selected state and the air passage 14 is in the power-electronics prioritized state or the battery prioritized state, the fan 102 takes the outside air into the outside-air intake passage 18 through the outside-air acquisition port 72. Then, the fan 102 causes the taken outside air to flow to the exhaust passage 52 through the main passage 40 and discharges the outside air from the exhaust port 100. Thus, the temperature of the battery 10 and the temperature of the power electronics device 12 are controlled by the outside air flowing through the air passage 14.

In addition, when the intake opening/closing member 20 is in the mixed-air selected state and the air passage 14 is in the power-electronics prioritized state or the battery prioritized state, the fan 102 takes in the inside air through the inside-air acquisition port 70 and also takes in the outside air through the outside-air acquisition port 72. Then, the fan 102 causes the taken mixed air of the inside air and outside air to flow to the exhaust passage 52 through the main passage 40 and discharges the mixed air from the exhaust port 100. Thus, the temperature of the battery 10 and the temperature of the power electronics device 12 are controlled by the mixed air flowing through the air passage 14.

In addition, when the air passage 14 is in the retention state, the fan 102 may be stopped.

Note that the fan 102 is not limited to that provided in the exhaust passage 52 and may be provided in the common intake passage 42 or in the main passage 40. Alternatively, the fan 102 may be omitted, and the inside air and the outside air may be taken into the air passage 14 by natural flow of the inside air and the outside air.

The inside-air temperature sensor 24 is disposed, for example, around the inside-air acquisition port 70 in the interior 68 of the vehicle 2 and detects the temperature of the inside air. Note that the inside-air temperature sensor 24 is not limited to that disposed around the inside-air acquisition port 70 and may be disposed at any position at which the temperature of the inside air in the interior 68 of the vehicle 2 can be appropriately detected.

For example, the outside-air temperature sensor 26 is exposed to the outside of the vehicle 2, is disposed around the outside-air acquisition port 72, and detects the temperature of the outside air. Note that the outside-air temperature sensor 26 is not limited to that disposed around the outside-air acquisition port 72 and may be disposed at any position at which the temperature of the outside air can be appropriately detected.

The control device 28 includes a communicator 110, one or more processors 112, and one or more memories 114 coupled to the one or more processors 112.

The communicator 110 establishes communication with devices and control devices mounted on the vehicle 2. For example, the control device 28 communicates with the power electronics device 12 through the communicator 110 and can acquire any information from the power electronics device 12.

The one or more memories 114 include a read-only memory (ROM) in which programs and the like are stored, and a random access memory (RAM) as a work area. The one or more processors 112 serve as a temperature controller 120 that implements an operation of the temperature control system 1 in cooperation with the programs included in the one or more memories 114. The temperature controller 120 will be described in detail later.

As described above, the temperature control of the battery 10 is performed such that the temperature of the battery 10 falls within the proper battery temperature range. Based on this, the names of temperature ranges are defined as follows.

FIG. 4 is a diagram illustrating definitions of the names of the temperature ranges. As illustrated in FIG. 4, a temperature range "low" is a temperature range lower than a battery lower limit temperature, which is a lower limit value of the proper battery temperature range. The battery lower limit temperature is set to, for example, 10° C., but may be set to an appropriate value according to the type of the battery 10 or the like.

A temperature range "middle low" is a temperature range higher than or equal to the battery lower limit temperature and lower than a predetermined reference temperature set in advance within the proper battery temperature range. The reference temperature is set to, for example, 20° C., but may be set to an appropriate value according to the type of the battery 10 or the like.

A temperature range "middle high" is a temperature range higher than or equal to the predetermined reference temperature set in advance within the proper battery temperature range and lower than a battery upper limit temperature, which is an upper limit value of the proper battery temperature range. The battery upper limit temperature is set to, for example, 30° C., but may be set to an appropriate value according to the type of the battery 10 or the like.

Here, the battery 10 is more likely to exhibit performance at a relatively low temperature in the proper battery temperature range. Therefore, the temperature range "middle low" is a better temperature range than the temperature range "middle high" in the proper battery temperature range.

A temperature range "high" is a temperature range higher than or equal to the battery upper limit temperature.

The temperature controller 120 performs switching control of the power-electronics prioritized state, the battery prioritized state, and the retention state with the passage switches 22, based on the output value of the power electronics device 12 in a state in which the temperature of the outside air is lower than the battery lower limit temperature, that is, in a state in which the temperature of the outside air is "low".

FIG. 5 is a diagram illustrating control performed when the temperature of the outside air is "low". In FIG. 5, for each combination of the temperature of the outside air, the temperature of the inside air, and the output value of the power electronics device 12, the state of the intake opening/closing member 20 and the state of the passage switches 22 are associated with each other. Note that in FIG. 5, the output value of the power electronics device 12 is abbreviated as "power electronics".

A power electronics "high" indicates that the output value of the power electronics device 12 is greater than or equal to a predetermined threshold value. A power electronics "low" indicates that the output value of the power electronics device 12 is less than the predetermined threshold value. The predetermined threshold value is set to an appropriate value with which it is possible to specify that active temperature control of the power electronics device 12 is expected in consideration of a relationship between the output value of the power electronics device 12 and the amount of heat generated by the power electronics device 12.

When the temperature of the outside air is "low", the temperature of the inside air is "high", and the power electronics is "high", the temperature controller 120 controls the intake opening/closing member 20 to be in the outside-air selected state and controls the passage switches 22 to be in the power-electronics prioritized state. In this case, the power electronics device 12 having generated a large amount of heat is preferentially cooled by the outside air having a low temperature. Also, in this case, the air after the heat exchange is warmed to a temperature of "middle low" or a temperature close to "middle low" by the heat exchange with the power electronics device 12. Since the battery 10 exchanges heat with the air warmed to the temperature of "middle low" or the temperature close to "middle low" by the power electronics device 12, the battery 10 is controlled to a more appropriate temperature.

When the temperature of the outside air is "low", the temperature of the inside air is "high", and the power electronics is "low", the temperature controller 120 controls the intake opening/closing member 20 to be in the shutoff selected state and controls the passage switches 22 to be in the retention state. In this case, since the amount of heat generated by the power electronics device 12 is small, it is not necessary to actively cool the power electronics device 12. Also, in this case, since the retained air is warmed by the heat generated by the power electronics device 12, and the battery 10 is warmed by the retained warmed air, the battery 10 is controlled to a more appropriate temperature.

When the temperature of the outside air is "low", the temperature of the inside air is "middle high", and the power electronics is "high", the temperature controller 120 controls the intake opening/closing member 20 to be in the outside-air selected state and controls the passage switches 22 to be in the power-electronics prioritized state. In this case, the power electronics device 12 having generated a large amount of heat is preferentially cooled by the outside air having a low temperature. Also, in this case, since the battery 10 exchanges heat with the air warmed to the temperature of "middle low" or the temperature close to "middle low" by the power electronics device 12, the battery 10 is controlled to a more appropriate temperature.

When the temperature of the outside air is "low", the temperature of the inside air is "middle high", and the power electronics is "low", the temperature controller 120 controls the intake opening/closing member 20 to be in the mixed-air selected state and controls the passage switches 22 to be in the battery prioritized state. In this case, since the amount of heat generated by the power electronics device 12 is small, it is not necessary to actively cool the power electronics device 12. Also, the outside air being "low" and the inside air being "middle high" are mixed to generate the mixed air being "middle low". Therefore, in this case, since the battery 10 exchanges heat with the mixed air being "middle low", the battery 10 is controlled to a more appropriate temperature.

When the temperature of the outside air is "low", the temperature of the inside air is "middle low", and the power electronics is "high", the temperature controller 120 controls the intake opening/closing member 20 to be in the outside-air selected state and controls the passage switches 22 to be in the power-electronics prioritized state. In this case, the power electronics device 12 having generated a large amount of heat is preferentially cooled by the outside air having a low temperature. Also, in this case, since the battery 10 exchanges heat with the air warmed to the temperature of "middle low" or the temperature close to "middle low" by the power electronics device 12, the battery 10 is controlled to a more appropriate temperature.

When the temperature of the outside air is "low", the temperature of the inside air is "middle low", and the power electronics is "low", the temperature controller 120 controls the intake opening/closing member 20 to be in the inside-air selected state and controls the passage switches 22 to be in the battery prioritized state. In this case, since the amount of heat generated by the power electronics device 12 is small, it is not necessary to actively cool the power electronics device 12. Also, in this case, since the battery 10 exchanges heat with the inside air being "middle low", the battery 10 is controlled to a more appropriate temperature.

When the temperature of the outside air is "low", the temperature of the inside air is "low", and the power electronics is "high", the temperature controller 120 controls the intake opening/closing member 20 such that air having the higher temperature of the outside air and the inside air is introduced into the air passage 14 and controls the passage switches 22 to be in the power-electronics prioritized state. In this case, since both the outside air and the inside air are "low", the temperature of even the air having the higher temperature of the outside air and the inside air is low. Thus, the power electronics device 12 having generated a large amount of heat is preferentially cooled by the air having the low temperature. In addition, since the battery 10 exchanges heat with the air warmed to the temperature of "middle low" or the temperature close to "middle low" by the power electronics device 12, the battery 10 is controlled to a more appropriate temperature. At this time, the air having the higher temperature of the outside air and the inside air is introduced into the air passage 14, so that the air after the heat exchange with the power electronics device 12 can be more reliably set to the temperature of "middle low" or the temperature close to "middle low".

When the temperature of the outside air is "low", the temperature of the inside air is "low", and the power electronics is "low", the temperature controller 120 controls the intake opening/closing member 20 to be in the shutoff selected state and controls the passage switches 22 to be in the retention state. In this case, since the amount of heat generated by the power electronics device 12 is small, it is not necessary to actively cool the power electronics device 12. Also, in this case, since the retained air can be warmed by the heat generated by the power electronics device 12, and the battery 10 can be warmed by the retained warmed air, the battery 10 is controlled to a more appropriate temperature.

In this manner, in a state in which the temperature of the outside air is "low", when the power electronics is "high", the temperature controller 120 controls the passage switches 22 such that the air passage 14 is in the power-electronics prioritized state.

FIG. 6 is a diagram illustrating control performed when the temperature of the outside air is "high", "middle high", and "middle low". In FIG. 6, for each combination of the temperature of the outside air, the temperature of the inside air, and the output value of the power electronics device 12, the state of the intake opening/closing member 20 and the state of the passage switches 22 are associated with each other. Note that in FIG. 6, the output value of the power electronics device 12 is abbreviated as "power electronics".

When the temperature of the outside air is "high", the temperature of the inside air is "high", and the power electronics is "high", the temperature controller 120 controls the intake opening/closing member 20 such that air having the lower temperature of the outside air and the inside air is introduced into the air passage 14 and controls the passage switches 22 to be in the power-electronics prioritized state.

When the temperature of the outside air is "high", the temperature of the inside air is "high", and the power electronics is "low", the temperature controller 120 controls the intake opening/closing member 20 such that the air having the lower temperature of the outside air and the inside air is introduced into the air passage 14 and controls the passage switches 22 to be in the battery prioritized state.

When the temperature of the outside air is "high", the temperature of the inside air is "middle high", and the power electronics is "high", the temperature controller 120 controls the intake opening/closing member 20 to be in the inside-air selected state and controls the passage switches 22 to be in the power-electronics prioritized state.

When the temperature of the outside air is "high", the temperature of the inside air is "middle high", and the power electronics is "low", the temperature controller 120 controls the intake opening/closing member 20 to be in the inside-air selected state and controls the passage switches 22 to be in the battery prioritized state.

When the temperature of the outside air is "high", the temperature of the inside air is "middle low", and the power electronics is "high", the temperature controller 120 controls the intake opening/closing member 20 to be in the inside-air selected state and controls the passage switches 22 to be in the power-electronics prioritized state.

When the temperature of the outside air is "high", the temperature of the inside air is "middle low", and the power electronics is "low", the temperature controller 120 controls the intake opening/closing member 20 to be in the inside-air selected state and controls the passage switches 22 to be in the battery prioritized state.

When the temperature of the outside air is "high", the temperature of the inside air is "low", and the power electronics is "high", the temperature controller 120 controls the intake opening/closing member 20 to be in the inside-air selected state and controls the passage switches 22 to be in the power-electronics prioritized state.

When the temperature of the outside air is "high", the temperature of the inside air is "low", and the power electronics is "low", the temperature controller 120 controls the intake opening/closing member 20 to be in the shutoff selected state and controls the passage switches 22 to be in the retention state.

When the temperature of the outside air is "middle high", the temperature of the inside air is "high", and the power electronics is "high", the temperature controller 120 controls the intake opening/closing member 20 to be in the outside-air selected state and controls the passage switches 22 to be in the power-electronics prioritized state.

When the temperature of the outside air is "middle high", the temperature of the inside air is "high", and the power electronics is "low", the temperature controller 120 controls the intake opening/closing member 20 to be in the outside-air selected state and controls the passage switches 22 to be in the battery prioritized state.

When the temperature of the outside air is "middle high", the temperature of the inside air is "middle high", and the power electronics is "high", the temperature controller 120 controls the intake opening/closing member 20 such that the air having the lower temperature of the outside air and the inside air is introduced into the air passage 14 and controls the passage switches 22 to be in the power-electronics prioritized state.

When the temperature of the outside air is "middle high", the temperature of the inside air is "middle high", and the power electronics is "low", the temperature controller 120 controls the intake opening/closing member 20 such that the air having the lower temperature of the outside air and the inside air is introduced into the air passage 14 and controls the passage switches 22 to be in the battery prioritized state.

When the temperature of the outside air is "middle high", the temperature of the inside air is "middle low", and the power electronics is "high", the temperature controller 120 controls the intake opening/closing member 20 to be in the inside-air selected state and controls the passage switches 22 to be in the power-electronics prioritized state.

When the temperature of the outside air is "middle high", the temperature of the inside air is "middle low", and the power electronics is "low", the temperature controller 120 controls the intake opening/closing member 20 to be in the inside-air selected state and controls the passage switches 22 to be in the battery prioritized state.

When the temperature of the outside air is "middle high", the temperature of the inside air is "low", and the power electronics is "high", the temperature controller 120 controls the intake opening/closing member 20 to be in the inside-air selected state and controls the passage switches 22 to be in the power-electronics prioritized state.

When the temperature of the outside air is "middle high", the temperature of the inside air is "low", and the power electronics is "low", the temperature controller 120 controls the intake opening/closing member 20 to be in the mixed-air selected state and controls the passage switches 22 to be in the battery prioritized state.

When the temperature of the outside air is "middle low", the temperature of the inside air is "high", and the power electronics is "high", the temperature controller 120 controls the intake opening/closing member 20 to be in the outside-air selected state and controls the passage switches 22 to be in the power-electronics prioritized state.

When the temperature of the outside air is "middle low", the temperature of the inside air is "high", and the power electronics is "low", the temperature controller 120 controls the intake opening/closing member 20 to be in the outside-air selected state and controls the passage switches 22 to be in the battery prioritized state.

When the temperature of the outside air is "middle low", the temperature of the inside air is "middle high", and the power electronics is "high", the temperature controller 120 controls the intake opening/closing member 20 to be in the outside-air selected state and controls the passage switches 22 to be in the power-electronics prioritized state.

When the temperature of the outside air is "middle low", the temperature of the inside air is "middle high", and the power electronics is "low", the temperature controller 120 controls the intake opening/closing member 20 to be in the outside-air selected state and controls the passage switches 22 to be in the battery prioritized state.

When the temperature of the outside air is "middle low", the temperature of the inside air is "middle low", and the power electronics is "high", the temperature controller 120 controls the intake opening/closing member 20 such that the air having the lower temperature of the outside air and the inside air is introduced into the air passage 14 and controls the passage switches 22 to be in the power-electronics prioritized state.

When the temperature of the outside air is "middle low", the temperature of the inside air is "middle low", and the power electronics is "low", the temperature controller 120 controls the intake opening/closing member 20 such that the air having the lower temperature of the outside air and the inside air is introduced into the air passage 14 and controls the passage switches 22 to be in the battery prioritized state.

When the temperature of the outside air is "middle low", the temperature of the inside air is "low", and the power electronics is "high", the temperature controller 120 controls the intake opening/closing member 20 to be in the inside-air selected state and controls the passage switches 22 to be in the power-electronics prioritized state.

When the temperature of the outside air is "middle low", the temperature of the inside air is "low", and the power electronics is "low", the temperature controller 120 controls the intake opening/closing member 20 to be in the outside-air selected state and controls the passage switches 22 to be in the battery prioritized state.

Figure 7:
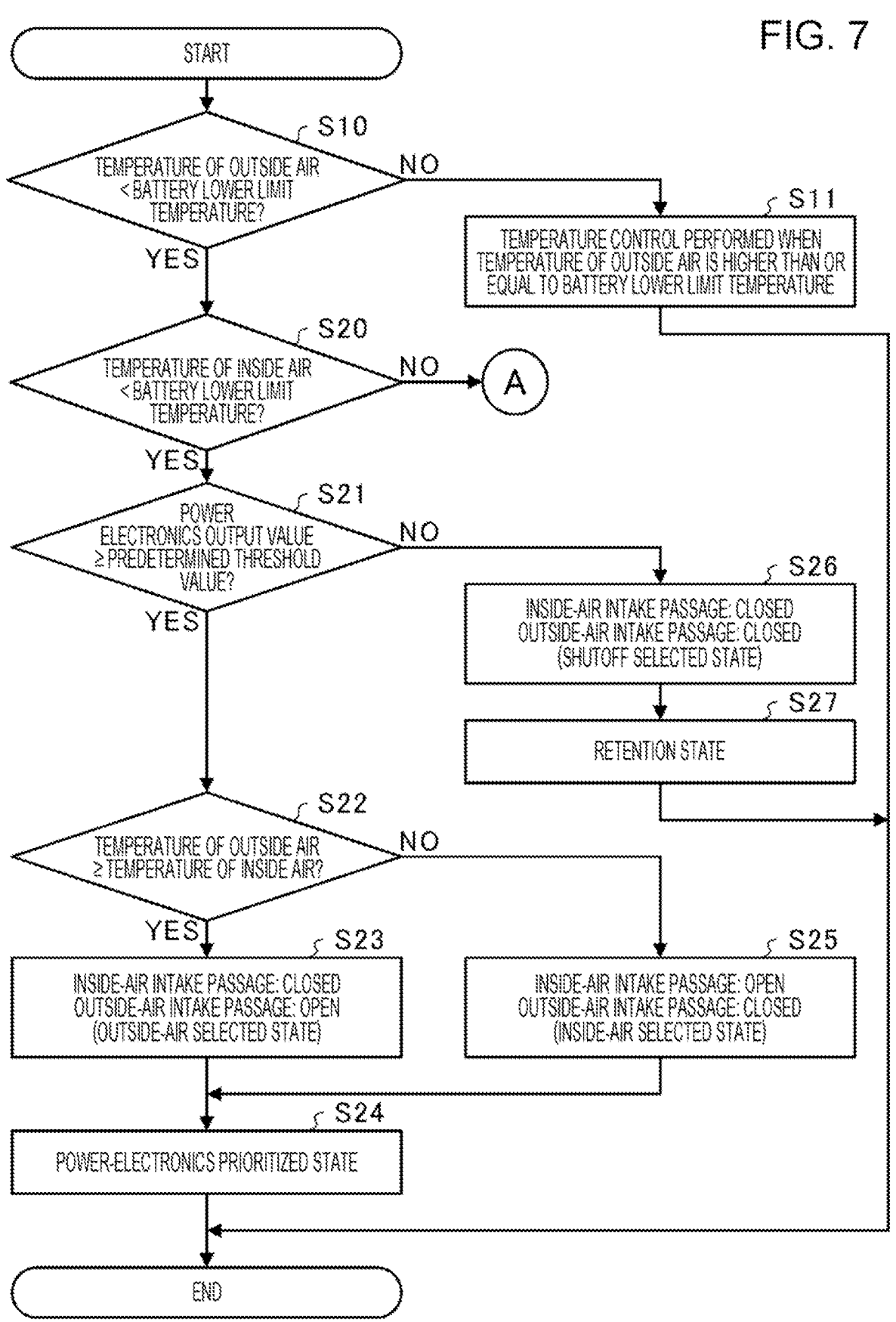
FIG. 7 is a flowchart illustrating an operation flow of a temperature controller.
Figure 9:
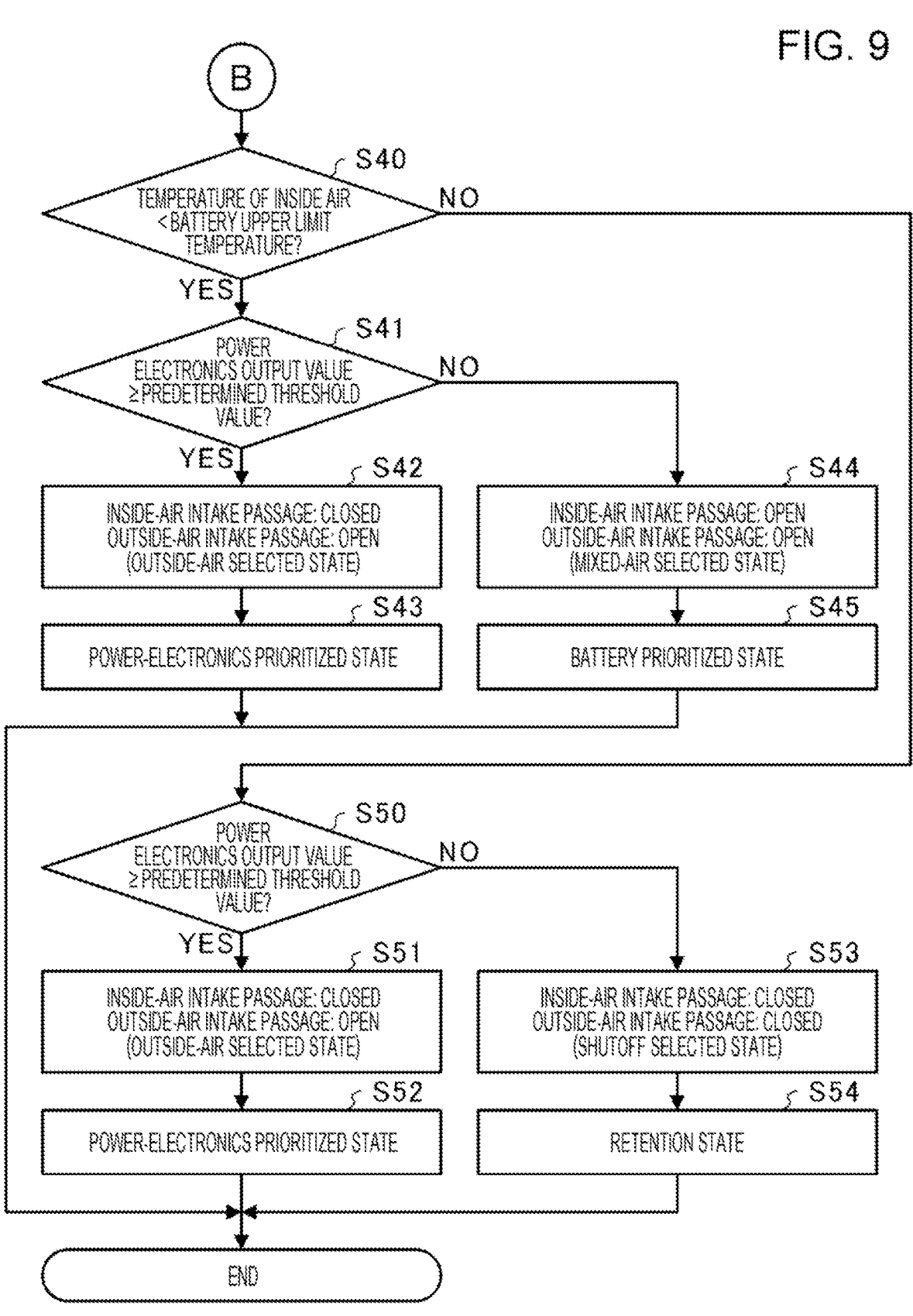
FIG. 9 is a flowchart illustrating an operation flow of the temperature controller.

FIGS. 7, 8, and 9 are flowcharts illustrating operation flows of the temperature controller 120. "A" in FIG. 7 is coupled to "A" in FIG. 8. "B" in FIG. 8 is coupled to "B" in FIG. 9. The temperature controller 120 repeatedly executes a series of processes in FIGS. 7 to 9 each time a predetermined interruption timing that arrives at predetermined time intervals arrives. The predetermined time interval is set to, for example, one second or the like, but may be set to any time in consideration of the speed of temperature change of the battery 10 and the power electronics device 12. Note that in FIGS. 7 to 9, the output value of the power electronics device 12 is abbreviated as "power electronics output value".

As illustrated in FIG. 7, when the predetermined interruption timing arrives, the temperature controller 120 acquires the temperature of the outside air detected by the outside-air temperature sensor 26 and determines whether the temperature of the outside air is lower than the battery lower limit temperature (S10).

When it is determined that the temperature of the outside air is higher than or equal to the battery lower limit temperature (NO in S10), the temperature controller 120 performs temperature control that is performed when the temperature of the outside air is higher than or equal to battery lower limit temperature (S11) and ends the series of processes. Although a description of a specific process flow in step S11 is omitted for the sake of simplicity, control for implementing the control pattern illustrated in FIG. 6 is performed in step S11.

When it is determined that the temperature of the outside air is lower than the battery lower limit temperature (YES in S10), the temperature controller 120 performs the process in and after step S20. The process in and after step S20 implements the control pattern illustrated in FIG. 5.

In step S20, the temperature controller 120 acquires the temperature of the inside air detected by the inside-air temperature sensor 24 and determines whether the temperature of the inside air is lower than the battery lower limit temperature (S20).

When it is determined that the temperature of the inside air is lower than the battery lower limit temperature (YES in S20), the temperature controller 120 acquires the output value of the power electronics device 12 and determines whether the output value of the power electronics device 12 is greater than or equal to the predetermined threshold value (S21).

When it is determined that the output value of the power electronics device 12 is greater than or equal to the predetermined threshold value (YES in S21), the temperature controller 120 determines whether the temperature of the outside air is higher than or equal to the temperature of the inside air (S22).

When it is determined that the temperature of the outside air is higher than or equal to the temperature of the inside air (YES in S22), the temperature controller 120 controls the intake opening/closing member 20 to be in the outside-air selected state in which the inside-air intake passage 16 is closed and the outside-air intake passage 18 is open (S23). Subsequently, the temperature controller 120 controls the passage switches 22 to be in the power-electronics prioritized state (S24) and ends the series of processes.

When it is determined that the temperature of the outside air is lower than the temperature of the inside air (NO in S22), the temperature controller 120 controls the intake opening/closing member 20 to be in the inside-air selected state in which the inside-air intake passage 16 is open and the outside-air intake passage 18 is closed (S25). Subsequently, the temperature controller 120 controls the passage switches 22 to be in the power-electronics prioritized state (S24) and ends the series of processes.

When it is determined in step S21 that the output value of the power electronics device 12 is less than the predetermined threshold value (NO in S21), the temperature controller 120 controls the intake opening/closing member 20 to be in the shutoff selected state in which the inside-air intake passage 16 is closed and the outside-air intake passage 18 is closed (S26). Subsequently, the temperature controller 120 controls the passage switches 22 to be in the retention state (S27) and ends the series of processes.

When it is determined in step S20 that the temperature of the inside air is higher than or equal to the battery lower limit temperature (NO in S20), the process proceeds from "A" in FIG. 7 to "A" in FIG. 8, and the temperature controller 120 determines whether the temperature of the inside air is lower than the reference temperature (S30).

When it is determined that the temperature of the inside air is lower than the reference temperature (YES in S30), the temperature controller 120 acquires the output value of the power electronics device 12 and determines whether the output value of the power electronics device 12 is greater than or equal to the predetermined threshold value (S31).

When it is determined that the output value of the power electronics device 12 is greater than or equal to the predetermined threshold value (YES in S31), the temperature controller 120 controls the intake opening/closing member 20 to be in the outside-air selected state in which the inside-air intake passage 16 is closed and the outside-air intake passage 18 is open (S32). Subsequently, the temperature controller 120 controls the passage switches 22 to be in the power-electronics prioritized state (S33) and ends the series of processes.

When it is determined in step S31 that the output value of the power electronics device 12 is less than the predetermined threshold value (No in S31), the temperature controller 120 controls the intake opening/closing member 20 to be in the inside-air selected state in which the inside-air intake passage 16 is open and the outside-air intake passage 18 is closed (S34). Subsequently, the temperature controller 120 controls the passage switches 22 to be in the battery prioritized state (S36) and ends the series of processes.

When it is determined in step S30 that the temperature of the inside air is higher than or equal to the reference temperature (NO in S30), the process proceeds from "B" in FIG. 8 to "B" in FIG. 9, and the temperature controller 120 determines whether the temperature of the inside air is lower than the battery upper limit temperature (S40).

When it is determined that the temperature of the inside air is lower than the battery upper limit temperature (YES in S40), the temperature controller 120 acquires the output value of the power electronics device 12 and determines whether the output value of the power electronics device 12 is greater than or equal to the predetermined threshold value (S41).

When it is determined that the output value of the power electronics device 12 is greater than or equal to the predetermined threshold value (YES in S41), the temperature controller 120 controls the intake opening/closing member 20 to be in the outside-air selected state in which the inside-air intake passage 16 is closed and the outside-air intake passage 18 is open (S42). Subsequently, the temperature controller 120 controls the passage switches 22 to be in the power-electronics prioritized state (S43) and ends the series of processes.

When it is determined in step S41 that the output value of the power electronics device 12 is less than the predetermined threshold value (No in S41), the temperature controller 120 controls the intake opening/closing member 20 to be in the mixed-air selected state in which the inside-air intake passage 16 is open and the outside-air intake passage 18 is open (S44). Subsequently, the temperature controller 120 controls the passage switches 22 to be in the battery prioritized state (S45) and ends the series of processes.

When it is determined in step S40 that the temperature of the inside air is higher than or equal to the battery upper limit temperature (NO in S40), the temperature controller 120 acquires the output value of the power electronics device 12 and determines whether the output value of the power electronics device 12 is greater than or equal to the predetermined threshold value (S50).

When it is determined that the output value of the power electronics device 12 is greater than or equal to the predetermined threshold value (YES in S50), the temperature controller 120 controls the intake opening/closing member 20 to be in the outside-air selected state in which the inside-air intake passage 16 is closed and the outside-air intake passage 18 is open (S51). Subsequently, the temperature controller 120 controls the passage switches 22 to be in the power-electronics prioritized state (S52) and ends the series of processes.

When it is determined in step S50 that the output value of the power electronics device 12 is less than the predetermined threshold value (No in S50), the temperature controller 120 controls the intake opening/closing member 20 to be in the shutoff selected state in which the inside-air intake passage 16 is closed and the outside-air intake passage 18 is closed (S53). Subsequently, the temperature controller 120 controls the passage switches 22 to be in the retention state (S54) and ends the series of processes.

In the flowcharts described above, when the passage switches 22 are controlled to be in the retention state, the intake opening/closing member 20 is controlled to be in the shutoff selected state. However, since the retention state can be implemented by the passage switches 22 without setting the intake opening/closing member 20 to be in the shutoff selected state, the intake opening/closing member 20 may be set to any state when the passage switches 22 are controlled to be in the retention state.

In the flowcharts described above, the control of the intake opening/closing member 20 and the control of the passage switches 22 are performed together. However, the control of the intake opening/closing member 20 and the control of the passage switches 22 may be performed independently.

Figure 10:
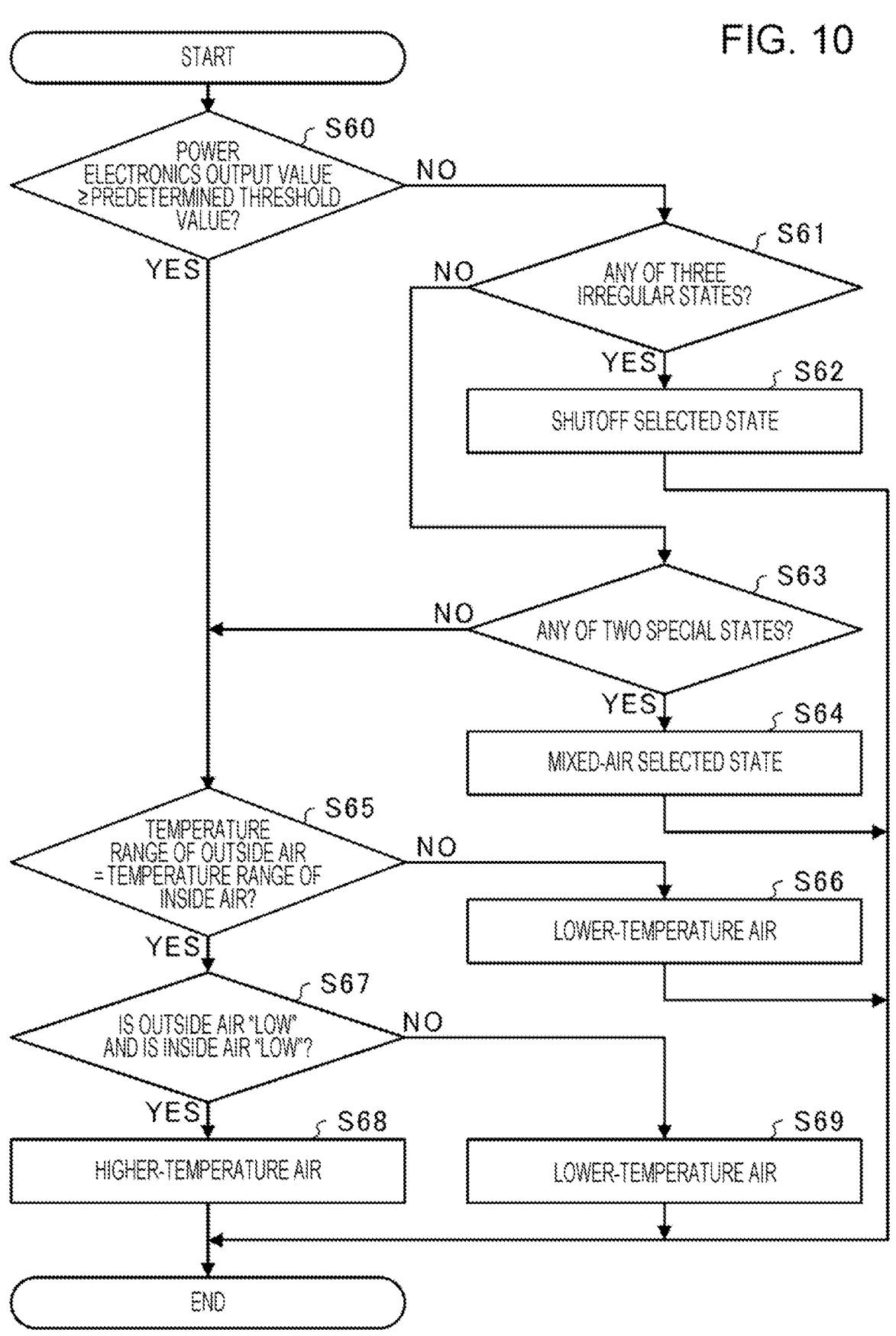
FIG. 10 is a flowchart illustrating an example in which the intake opening/closing member is individually controlled regardless of the control of the passage switches.

FIG. 10 is a flowchart illustrating an example in which the intake opening/closing member 20 is individually controlled regardless of the control of the passage switches 22. The regularity of the control of the intake opening/closing member 20 will be described below with reference to FIG. 10.

The temperature controller 120 acquires the output value of the power electronics device 12 and determines whether the output value of the power electronics device 12 is greater than or equal to the predetermined threshold value (S60).

When it is determined that the output value of the power electronics device 12 is less than the predetermined threshold value (NO in S60), the temperature controller 120 determines whether the combination of the temperature of the outside air and the temperature of the inside air is in any of three irregular states (S61). The three irregular states are a state in which the temperature of the outside air is "low" and the temperature of the inside air is "low", a state in which the temperature of the outside air is "high" and the temperature of the inside air is "low", and a state in which the temperature of the outside air is "low" and the temperature of the inside air is "high".

When it is determined that the combination is in one of the three irregular states (YES in S61), the temperature controller 120 controls the intake opening/closing member 20 to be in the shutoff selected state (S62). That is, when the power electronics is "low" and the combination of the temperature of the outside air and the temperature of the inside air is any one of the outside air being "low" and the inside air being "low", the outside air being "high" and the inside air being "low", and the outside air being "low" and the inside air being "high", the intake opening/closing member 20 is controlled to be in the shutoff selected state.

When it is determined that the combination is in none of the three irregular states (NO in S61), the temperature controller 120 determines whether the combination of the temperature of the outside air and the temperature of the inside air is in any of two special states (S63). The two special states are a state in which the temperature of the outside air is "low" and the temperature of the inside air is "middle high" and a state in which the temperature of the outside air is "middle high" and the temperature of the inside air is "low".

When it is determined that the combination is one of the two special states (YES in S63), the temperature controller 120 controls the intake opening/closing member 20 to be in the mixed-air selected state (S64). That is, when the power electronics is "low", the outside air is "low", and the inside air is "middle high", or when the power electronics is "low", the outside air is "middle high" and the inside air is "low", the intake opening/closing member 20 is controlled to be in the mixed-air selected state.

When it is determined that the output value of the power electronics device 12 is greater than or equal to the predetermined threshold value (YES in S60), the temperature controller 120 determines whether a temperature range of the outside air is equal to a temperature range of the inside air (S65). When it is determined that the combination is in none of the two special states (NO in S63), the temperature controller 120 also determines whether the temperature range of the outside air is equal to the temperature range of the inside air (S65).

That the temperature range of the outside air is equal to the temperature range of the inside air means that the temperature of the outside air is "low" and the temperature of the inside air is "low" or that the temperature of the outside air is "high" and the temperature of the inside air is "high". Alternatively, that the temperature range of the outside air is equal to the temperature range of the inside air means that the temperature of the outside air is "middle high" and the temperature of the inside air is "middle high", or that the temperature of the outside air is "middle low" and the temperature of the inside air is "middle low".

When it is determined that the temperature range of the outside air is not equal to the temperature range of the inside air (NO in S65), the temperature controller 120 controls the intake opening/closing member 20 such that the air having the lower temperature of the outside air and the inside air is introduced into the air passage 14 (S66). That is, when the power electronics is "high" and the temperature range of the outside air is not equal to the temperature range of the inside air, the intake opening/closing member 20 is controlled such that the air having the lower temperature of the outside air and the inside air is introduced into the air passage 14. In addition, when the power electronics is "low", the combination is in none of the three irregular states or the two special states, and the temperature range of the outside air is not equal to the temperature range of the inside air, the intake opening/closing member 20 is also controlled such that the air having the lower temperature of the outside air and the inside air is introduced into the air passage 14.

When it is determined that the temperature range of the outside air is equal to the temperature range of the inside air (YES in S65), the temperature controller 120 determines whether the temperature of the outside air is "low" and the temperature of the inside air is "low" (S67).

When it is determined that the temperature of the outside air is "low" and the temperature of the inside air is "low" (YES in S67), the temperature controller 120 controls the intake opening/closing member 20 such that the air having the higher temperature of the outside air and the inside air is introduced into the air passage 14 (S68). That is, when the power electronics is "high", the outside air is "low", and the inside air is "low", the intake opening/closing member 20 is controlled such that the air having the higher temperature of the outside air and the inside air is introduced into the air passage 14. In addition, when the power electronics is "low", the combination is in none of the three irregular states or the two special states, the outside air is "low", and the inside air is "low", the intake opening/closing member 20 is also controlled such that the air having the higher temperature of the outside air and the inside air is introduced into the air passage 14.

When it is determined that the temperature of the outside air is "low" and the temperature of the inside air is not "low" (NO in S67), the temperature controller 120 controls the intake opening/closing member 20 such that the air having the lower temperature of the outside air and the inside air is introduced into the air passage 14 (S69). That is, when the power electronics is "high", the outside air is "high", and the inside air is "high", when the power electronics is "high", the outside air is "middle high", and the inside air is "middle high", or when the power electronics is "high", the outside air is "middle low", and the inside air is "middle low", the intake opening/closing member 20 is controlled such that the air having the lower temperature of the outside air and the inside air is introduced into the air passage 14.

Figure 11:
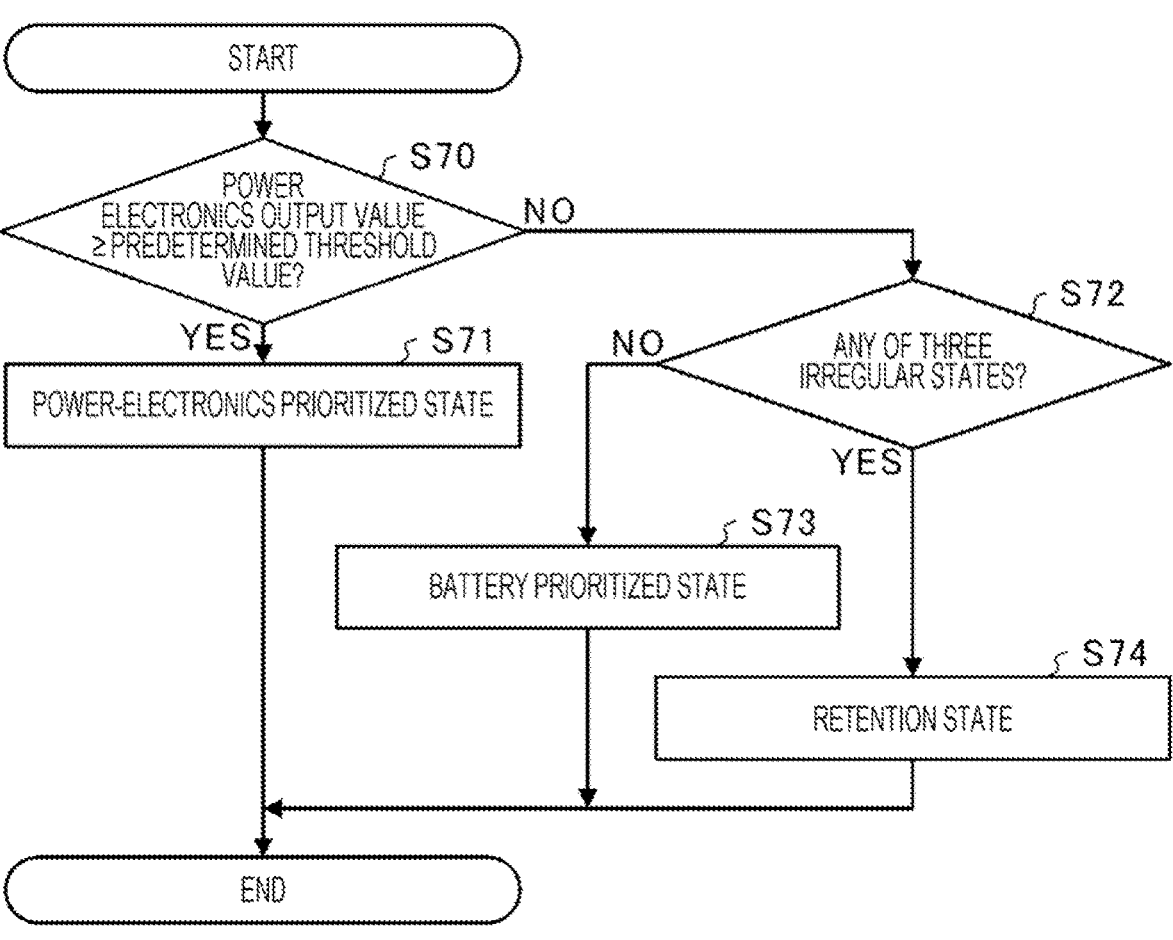
FIG. 11 is a flowchart illustrating an example in which the passage switches are individually controlled regardless of the control of the intake opening/closing member.

FIG. 11 is a flowchart illustrating an example in which the passage switches 22 are individually controlled regardless of the control of the intake opening/closing member 20. The regularity of the control of the passage switches 22 will be described below with reference to FIG. 11.

The temperature controller 120 acquires the output value of the power electronics device 12 and determines whether the output value of the power electronics device 12 is greater than or equal to the predetermined threshold value (S70).

When it is determined that the output value of the power electronics device 12 is greater than or equal to the predetermined threshold value (YES in S70), the temperature controller 120 controls the passage switches 22 to be in the power-electronics prioritized state (S71). That is, as long as the power electronics is "high", the passage switches 22 are controlled to be in the power-electronics prioritized state regardless of the temperature of the outside air and the temperature of the inside air.

When it is determined that the output value of the power electronics device 12 is less than the predetermined threshold value (NO in S70), the temperature controller 120 acquires the temperature of the outside air and the temperature of the inside air and determines whether the combination of the temperature of the outside air and the temperature of the inside air is in any of the above-described three irregular states (S72).

When it is determined that the combination is in none of the three irregular states (NO in S72), the temperature controller 120 controls the passage switches 22 to be in the battery prioritized state (S73). That is, when the power electronics is "low" and the combination of the temperature of the outside air and the temperature of the inside air is none of the outside air being "low" and the inside air being "low", the outside air being "high" and the inside air being "low", and the outside air being "low" and the inside air being "high", the passage switches 22 are controlled to be in the battery prioritized state.

When it is determined that the combination is in one of the three irregular states (YES in S72), the temperature controller 120 controls the passage switches 22 to be in the retention state (S74). That is, when the power electronics is "low" and the combination of the temperature of the outside air and the temperature of the inside air is any one of the outside air being "low" and the inside air being "low", the outside air being "high" and the inside air being "low", and the outside air being "low" and the inside air being "high", the passage switches 22 are controlled to be in the retention state.

As described above, in the temperature control system 1 according to the embodiment, in a state in which the temperature of the outside air is "low", switching control is performed among the power-electronics prioritized state, the battery prioritized state, and the retention state with the passage switches 22, based on the output value of the power electronics device 12.

In more detail, in the temperature control system 1 according to the embodiment, when the output value of the power electronics device 12 is greater than or equal to the predetermined threshold value, the passage switches 22 are controlled such that the air passage 14 is in the power-electronics prioritized state.

Accordingly, in the temperature control system 1 according to the embodiment, the temperature control can be performed preferentially on the power electronics device 12 when the amount of heat generated by the power electronics device 12 is large. In addition, in the temperature control system 1 according to the embodiment, the temperature control can be performed preferentially on the battery 10 over the power electronics device 12 when the amount of heat generated by the power electronics device 12 is not large.

Therefore, according to the temperature control system 1 according to the embodiment, it is possible to appropriately perform the temperature control of the battery 10 and the power electronics device 12.

In addition, in the temperature control system 1 according to the embodiment, in a state in which the temperature of the outside air is "low", when the temperature of the inside air is "middle high" and the output value of the power electronics device 12 is less than the predetermined threshold value, the intake opening/closing member 20 is controlled such that the mixed air of the inside air and the outside air is introduced into the air passage 14, and the passage switches 22 are controlled such that the air passage 14 is in the battery prioritized state.

Accordingly, in the temperature control system 1 according to the embodiment, the mixed air being "middle low" can be generated by mixing the inside air being "middle high" and the outside air being "low", and the temperature control of the battery 10 can be performed by the mixed air being "middle low". As a result, in the temperature control system 1 according to the embodiment, for example, the temperature of the battery 10 can be controlled to a more appropriate temperature.

In addition, in the temperature control system 1 according to the embodiment, in a state in which the temperature of the outside air is "low", when the temperature of the inside air is "low" and the output value of the power electronics device 12 is less than the predetermined threshold value, the passage switches 22 are controlled such that the air passage 14 is in the retention state.

When the air passage 14 is brought into the retention state, the air retained in the air passage 14 is gradually warmed by the heat generated by the power electronics device 12. In the temperature control system 1 according to the embodiment, the battery 10 is warmed by the air warmed in this manner. As a result, in the temperature control system 1 according to the embodiment, even in a state in which the temperatures of the inside air and the outside air are relatively low, the temperature of the battery 10 can be controlled to a more appropriate temperature without excessively cooling the power electronics device 12.

In addition, in the temperature control system 1 according to the embodiment, in a state in which the temperature of the outside air is "low", when the temperature of the inside air is "low" and the output value of the power electronics device 12 is greater than or equal to the predetermined threshold value, the intake opening/closing member 20 is controlled such that the air having the higher temperature of the inside air and the outside air is introduced into the air passage 14, and the passage switches 22 are controlled such that the air passage 14 is in the power-electronics prioritized state.

In this case, since the temperatures of both the inside air and the outside air are low, even if the air having the higher temperature of the inside air and the outside air is introduced into the air passage 14, the air having a low temperature is introduced into the air passage 14. Accordingly, in the temperature control system 1 according to the embodiment, the air having a low temperature can cool the power electronics device 12 having generated a large amount of heat.

In addition, in this case, since the air having the higher temperature of the inside air and the outside air exchanges heat with the power electronics device 12, the temperature of the air after the heat exchange with the power electronics device 12 can be set to "middle low" or a temperature close to "middle low". Accordingly, in the temperature control system 1 according to the embodiment, the temperature control of the battery 10 can be performed by the air being "middle low" or close to "middle low". As a result, the temperature control system 1 according to the embodiment can perform the temperature control of the battery 10 to set a more appropriate temperature while appropriately cooling the power electronics device 12.

Although the embodiment of the present disclosure has been described above with reference to the accompanying drawings, the present disclosure is not limited to the embodiment. It is clear that those skilled in the art can conceive of various modifications or corrections within the scope described in the claims. It is to be understood that these are naturally included in the technical scope of the disclosure.

According to the present disclosure, it is possible to appropriately perform the temperature control of the battery and the power electronics device.

The invention claimed is:

1. A temperature control system comprising:
    a battery mounted on a vehicle;

a power electronics device mounted on the vehicle and configured to convert high-voltage electric power;

an air passage in which the battery and the power electronics device are disposed and through which air that exchanges heat with the battery and the power electronics device is to flow;

an inside-air intake passage configured to acquire inside air that is air inside the vehicle, and to supply the inside air to the air passage;

an outside-air intake passage configured to acquire outside air that is air outside the vehicle, and to supply the outside air to the air passage;

an intake opening/closing member configured to open and close between the air passage and the inside-air intake passage as well as open and close between the air passage and the outside-air intake passage;

passage switches configured to switch among a power-electronics prioritized state in which the air introduced into the air passage exchanges heat with the power electronics device earlier than with the battery, a battery prioritized state in which the air introduced into the air passage exchanges heat with the battery earlier than with the power electronics device, and a retention state in which the air is retained inside the air passage; and a control device, wherein the control device comprises:

one or more processors; and one or more memories coupled to the one or more processors, and the one or more processors are configured to perform a process comprising:

in a state in which a temperature of the outside air is lower than a battery lower limit temperature that is a lower limit value of a proper battery temperature range that is a temperature range expected for appropriately operating the battery, performing switching control of the power-electronics prioritized state, the battery prioritized state, and the retention state with the passage switches, based on an output value of the power electronics device.

2. The temperature control system according to claim 1, wherein the process includes controlling, when the output value of the power electronics device is greater than or equal to a predetermined threshold value in the state in which the temperature of the outside air is lower than the battery lower limit temperature, the passage switches such that the air passage is in the power-electronics prioritized state.

3. The temperature control system according to claim 1, wherein the process includes, in the state in which the temperature of the outside air is lower than the battery lower limit temperature, when a temperature of the inside air is equal to or higher than a reference temperature set in advance within the proper battery temperature range and is lower than a battery upper limit temperature that is an upper limit value of the proper battery temperature range, and the output value of the power electronics device is lower than a predetermined threshold value:

controlling the intake opening/closing member such that mixed air of the inside air and the outside air is introduced into the air passage; and controlling the passage switches such that the air passage is in the battery prioritized state.

4. The temperature control system according to claim 1, wherein the process includes controlling, when a temperature of the inside air is lower than the battery lower limit temperature and the output value of the power electronics device is less than a predetermined threshold value in the state in which the temperature of the outside air is lower than the battery lower limit temperature, the passage switches such that the air passage is in the retention state.

5. The temperature control system according to claim 1, wherein the process includes, in the state in which the temperature of the outside air is lower than the battery lower limit temperature, when a temperature of the inside air is lower than the battery lower limit temperature and the output value of the power electronics device is greater than or equal to a predetermined threshold value:

controlling the intake opening/closing member such that air having a higher temperature of the inside air and the outside air is introduced into the air passage; and controlling the passage switches such that the air passage is in the power-electronics prioritized state.

* * * * *